United States Patent Office
3,036,846
Patented May 29, 1962

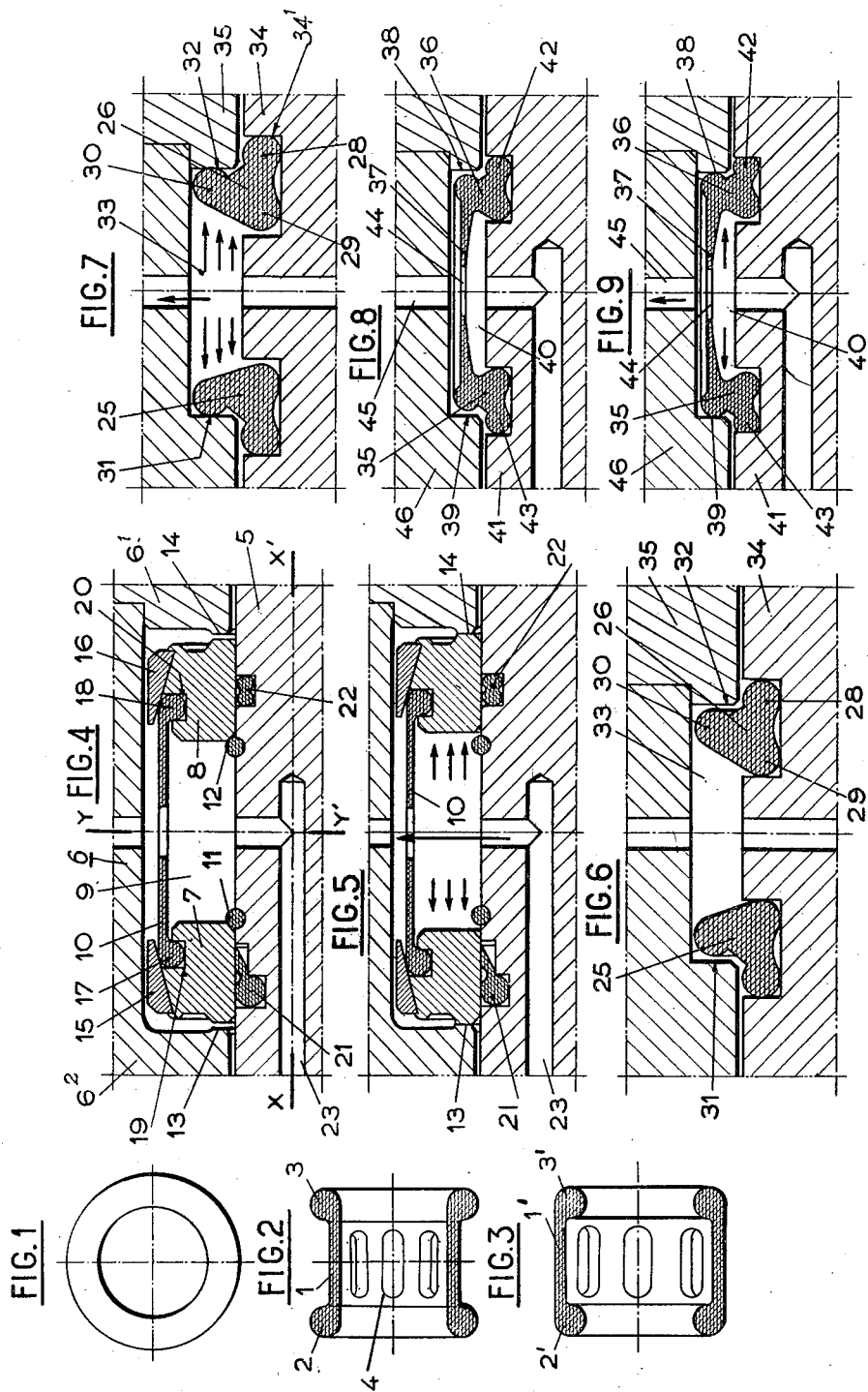

3,036,846
FLUID-TIGHT PACKING WHICH FORMS A SPRING BETWEEN RINGS ON ROTATING MEMBERS AND WHICH IS CAPABLE OF DRIVING AN EXTERNAL MEMBER
Lucien Péras, Billancourt, France, assignor to Regie Nationale des Usines Renault, Billancourt, France
Filed Jan. 2, 1957, Ser. No. 632,047
Claims priority, application France Jan. 20, 1956
1 Claim. (Cl. 285—96)

The present invention relates to elastic packings for the purpose of providing fluid-tightness between a fixed part and a movable rotating part which are bodies of revolution and concentric, the said packings being also capable of acting as tension or compression springs, or both, between two rings arranged on a rotating member, and of driving an external member.

Elastic packings for similar uses are already known which comprise the use of metal springs, which always deteriorate with use.

The packing according to the invention is characterised essentially in that it is made of rubber or plastic material, that it is composed of two annular elements which are generally connected by an element of cylindrical tubular form, the two annular elements then forming external or internal circular beads at the two ends of the tubular element, and in that the said packing is adapted to ensure fluid-tightness between a fixed part and a movable concentric part by being deformed under the action of a fluid under pressure admitted into its interior, the packing being held in position by the internal pressure and its own elastic tension.

In order to allow the general advantageous nature of the invention to be better understood, a description will now be given of some preferred embodiments, taken as non-limitative examples, with reference to the accompanying drawings, wherein:

FIG. 1 is an end view of a packing comprising a tubular element and external beads;

FIG. 2 is a longitudinal sectional view of the same packing;

FIG. 3 is a longitudinal sectional view of a packing having internal beads;

FIGS. 4 and 5 illustrate the use of a type of packing derived from the type shown in FIG. 3, in a pneumatic clutch;

FIGS. 6 and 7 show the arrangement in a pneumatic clutch of a packing formed of two annular elements, that is to say elements defined by end beads only;

FIGS. 8 and 9 illustrate a packing comprising a central portion which is substantially tubular in form, with specially profiled end beads.

In those figures of the drawing relating to a pneumatic clutch, the even-numbered FIGURES 4, 6, 8 show the packings in the declutched position, and the odd-numbered FIGURES 5, 7, 9 show the packings in the engaged position.

Referring now to FIGS. 1 and 2, it will be seen that the packing according to the invention is formed of a tubular cylindrical body or sleeve 1, which terminates at each axial end in beads 2 and 3 and which is adapted to exert an elastic force tending to bring its two ends towards one another. The sleeve 1 is formed with slots 4 in order to permit the passage of a fluid therethrough.

FIG. 3 shows a variant of FIG. 2 wherein the beads 2' and 3' are arranged on the radially inner side of the sleeve 1'.

FIGS. 4 and 5 show the use of a packing as described in FIGURE 3.

The apparatus on which the packing is shown in position, comprises a fixed shaft 5 of axis X—X', about which rotates the movable part 6 or casing which is composed of two pieces $6^1$ and $6^2$ in order to facilitate assembly. Two metal rings 7 and 8 arranged opposite one another assist in providing fluid-tightness between the two parts 5 and 6 rotating relatively to one another, and they form between them a chamber 9 in which an intermittent pressure prevails. For this purpose, the shaft 5 is formed with an axial duct 23 which communicates with the chamber 9 and through which fluid under pressure is adapted to reach the said chamber when an admission and shut-off means (not shown) is operated. Similarly, the piece $6^2$ is formed with an axial outlet for removal of the fluid.

During the entire time there is an absence of pressure in the chamber 9, the two rings 7 and 8 are drawn towards one another by a packing 10 of the type described hereinbefore and illustrated in FIG. 3, which by virtue of its elasticity causes them to abut against two toric packings 11 and 12 embedded in the shaft, and thus makes them move away from the contact surfaces 13 and 14. The parts $6^1$ and $6^2$ may then rotate about the shaft 5 freed of any friction.

Fluid arriving under pressure in the chamber 9 produces forces which act in the direction of the arrows (FIG. 5), and cause the two rings 7 and 8 to bear against the contact surfaces 13 and 14 of the parts $6^1$ and $6^2$ of the casing, closing off the chamber 9 perfectly. It will be seen that the packing 10 is secured to the rings 7 and 8 by the wedge-section rings 15 and 16 which lock the end beads 17 and 18 in the grooves 19 and 20 of the rings 7 and 8.

Packings such as shown at 21 or 22 provide fluid-tightness between the rings 7 and 8 and the shaft 5. The packing as shown at 21 is used in cases where the fluid is admitted through the duct 23 under high pressure (this is the case shown in the left-hand half of FIGS. 4 and 5) and the packing as shown at 22, which is a double-torus packing, is used in cases where the fluid is admitted through the duct 23 at low pressure.

FIGS. 6 and 7 illustrate a packing in two parts which are arranged symmetrically and which operate by compression.

The packing elements 25 and 26 are intended to be subjected to a fairly strong pressure in an intermittent manner and to be used in opposition to one another. These half-packings are mounted tensionally on the shaft 34, since their internal diameter is less than the diameter of the bottom of the grooves which forms seats for said elements in the shaft 34 and the width of each seat is such that the lips 28 and 29 form a double-torus packing and they are held tightly seated by the shoulders of the seat. By virtue of the form of the packings, and by reason of their elastic tension, the lips 30 do not come into contact with the packing surfaces 31 and 32 during the entire time there is an absence of pressure in the chamber 33.

When pressure is admitted to the chamber 33 (FIG. 7), the lips 30 are made to bear strongly against the surfaces 31 and 32 while the lips 28 are simultaneously pressed against the outer shoulder of the seats $34^1$, thus ensuring perfect fluid-tightness in the chamber 33.

These features give this type of packing all the qualities required for the air supply system of a pneumatic clutch arrangement, and prevent the packing 26 which is fast with the shaft 34 from rubbing against the movable part 35 when the clutch is not being used.

FIGS. 8 and 9 illustrate packings 35 and 36 which operate by compression and are arranged in opposed fashion to one another as are those of the preceding FIGS. 6 and 7, but connected together by an elastic diaphragm 37 of the same material, which exerts tractive force and holds them away from the contact surfaces 38 and 39

(FIG. 8) as long as there is an absence of pressure in the chamber 40, thus preventing any friction from taking place between the parts 41 and 46 during rotation.

When fluid under pressure arrives in the chamber 40 (FIG. 9), it presses the packings 35 and 36 against their seats 38 and 39 and causes their lips 42 and 43 to bear against the shoulders of the housings in the fixed shaft 41 on which they are tensionally mounted. Perforations 44 formed in the diaphragm 37 allow the fluid free access from the chamber 40 to the conduit 45 towards the clutch.

It should be understood that the description given hereinbefore and also the accompanying drawings are given by way of non-limitative example and that other forms of embodiment are conceivable without departing from the scope of the invention.

I claim:

A sealing construction comprising, in combination with a pair of relatively rotatable elements, a pair of deformable packing units each comprising an annular member having a generally toric form, said units being seated in substantially fixed relationship with respect to one of said elements to define between said elements a confined chamber, said elements being formed with conduit means for admission of a fluid under pressure into said chamber in direct contact with said units to cause said units to be urged solely by the direct action of said fluid under pressure into contact with the other of said elements to provide a seal between said elements, each unit having an elasticity provided by said annular member such that they return to their initial position and release said seal upon release of the pressure of said fluid in direct contact with said units, said units including rigid annular sleeves each having recesses in which at least a portion of an annular member is received, and elastic gaskets engaging and providing fluid-tightness between said sleeves and said one of said elements.

References Cited in the file of this patent

UNITED STATES PATENTS

| | | |
|---|---|---|
| 421,657 | Bowers | Feb. 18, 1890 |
| 906,849 | Baashuus | Dec. 15, 1908 |
| 1,818,985 | Burnish | Aug. 18, 1931 |
| 2,133,487 | Spargo | Oct. 18, 1938 |
| 2,272,890 | Bosomworth | Feb. 10, 1942 |
| 2,305,809 | Maisch | Dec. 22, 1942 |
| 2,310,309 | Orr | Feb. 9, 1943 |
| 2,383,667 | Matter | Aug. 28, 1945 |
| 2,459,981 | Warren | Jan. 25, 1949 |
| 2,495,463 | LeTourneau | Jan. 24, 1950 |
| 2,551,918 | Wickwire | May 8, 1951 |
| 2,563,014 | Buhayar | July 24, 1951 |
| 2,610,651 | Hahn | Sept. 16, 1952 |
| 2,635,931 | May | Apr. 21, 1953 |
| 2,685,462 | Lofqvist | Aug. 3, 1954 |
| 2,727,761 | Elliott | Dec. 20, 1955 |
| 2,751,235 | Watts et al. | June 19, 1956 |
| 2,754,136 | Phillips | July 10, 1956 |
| 2,759,583 | Ward | Aug. 21, 1956 |
| 2,760,794 | Hartranft | Aug. 28, 1956 |
| 2,818,949 | Giffen | Jan. 7, 1958 |

FOREIGN PATENTS

| | | |
|---|---|---|
| 732,449 | Germany | Mar. 3, 1943 |
| 838,525 | Germany | June 3, 1952 |